United States Patent
Blokzijl et al.

(10) Patent No.: US 8,161,282 B2
(45) Date of Patent: Apr. 17, 2012

(54) SYSTEM AND METHOD FOR REQUESTING AND ISSUING AN AUTHORIZATION DOCUMENT

(75) Inventors: Anko Jan Blokzijl, Soest (NL); Gerard Paalman, The Hague (NL); Gerlof Henno Noordhof, Maarssen (NL)

(73) Assignee: SDU Identification B.V., Haarlem (NL)

( * ) Notice: Subject to any disclaimer, the term of this patent is extended or adjusted under 35 U.S.C. 154(b) by 889 days.

(21) Appl. No.: 12/095,693

(22) PCT Filed: Nov. 29, 2006

(86) PCT No.: PCT/NL2006/050300
§ 371 (c)(1),
(2), (4) Date: May 30, 2008

(87) PCT Pub. No.: WO2007/086727
PCT Pub. Date: Aug. 2, 2007

(65) Prior Publication Data
US 2010/0223460 A1    Sep. 2, 2010

(30) Foreign Application Priority Data
Nov. 30, 2005    (NL) ...................................... 1030558

(51) Int. Cl.
*H04L 9/32*    (2006.01)

(52) U.S. Cl. ........ 713/168; 713/157; 713/182; 713/186; 713/189

(58) Field of Classification Search ................... 713/157, 713/182, 186, 189, 168
See application file for complete search history.

(56) References Cited

U.S. PATENT DOCUMENTS

| | | | |
|---|---|---|---|
| 7,805,611 B1 * | 9/2010 | Montemayor et al. ........ 713/172 |
| 2002/0065912 A1 * | 5/2002 | Catchpole et al. ............ 709/224 |
| 2002/0150277 A1 | 10/2002 | Nishimoto et al. |
| 2003/0140233 A1 | 7/2003 | Samar |
| 2005/0005136 A1 * | 1/2005 | Chen et al. ..................... 713/186 |
| 2005/0015594 A1 * | 1/2005 | Ashley et al. ................. 713/168 |
| 2005/0021983 A1 * | 1/2005 | Arnouse ....................... 713/186 |
| 2005/0109836 A1 | 5/2005 | Ben-Aissa |
| 2005/0171787 A1 | 8/2005 | Zagami |
| 2006/0050931 A1 * | 3/2006 | Oka .............................. 382/115 |

(Continued)

FOREIGN PATENT DOCUMENTS

JP    2005309905    4/2005

(Continued)

*Primary Examiner* — Nabil El Hady (74) *Attorney, Agent, or Firm* — Fliesler Meyer LLP (57) ABSTRACT

A device and method for supporting the issuing of an authorization document (6) to an applicant; the said device comprising: a computer (10(*i*)) comprising a first processor and a first memory containing stored first data and instructions to allow the first processor to execute a first defined program, a clerk unit (13(*i*)) comprising a second processor (17) and a second memory containing stored second data and instructions to allow the second processor (17) to execute a second defined program, as well as a secure application module (41), and a client unit (15(*i*)) comprising at least a biometric characteristic reader unit (27; 31) for reading a biometric characteristic of the applicant, wherein the client unit (15(*i*)) and the second processor (17) can communicate with each other, and the first processor and the second processor (17) can communicate with each other in the form of a secure session that makes use of a cryptographic key stored in the secure application module (41).

13 Claims, 8 Drawing Sheets

U.S. PATENT DOCUMENTS

2006/0179481 A1* 8/2006 D'Agnolo ....................... 726/20
2008/0028230 A1* 1/2008 Shatford ....................... 713/186
2008/0072065 A1* 3/2008 Bonalle et al. ................ 713/186
2008/0148059 A1* 6/2008 Shapiro ........................ 713/186

FOREIGN PATENT DOCUMENTS

JP 2005309906 4/2005
WO 2005103973 11/2005

* cited by examiner

SYSTEM AND METHOD FOR REQUESTING AND ISSUING AN AUTHORIZATION DOCUMENT

This application is a national stage application that claims priority under U.S.C. 371 to Patent Cooperation Treaty Application No. PCT/NL2006/050300, entitled "SYSTEM AND METHOD FOR REQUESTING AND ISSUING AN AUTHORIZATION DOCUMENT", inventors Anko Jan Blokzijl, Gerard Paalman, and Gerlof Henno Noordhof, filed Nov. 29, 2006, and which has been published as Publication No. WO2007/086727, which application is herein incorporated by reference.

The invention relates to a system and method for requesting and issuing authorization documents such as passports, driving licenses, ID cards and similar.

CURRENT STATE OF THE ART

The device and the method to which the invention relates is used in particular for the requesting and issuing of passports or identity cards that are necessary when crossing a border. The invention can also however be used for requesting and issuing other types of authorization documents, such as driving licenses, identity cards for obtaining access to a certain location or room, or for obtaining an access right to a system such as a computer or a terminal, etc. To that effect, the concept "authorization document" has here a broad meaning.

The use of biometrics on a passport, as supplement to or instead of a passport photograph and signature, is also known and serves to support the verification of the holder of the authorization document. Known biometric characteristics which can also be used with the invention include, for example: an image of an eye (iris), speech, palm prints, fingerprints, face, and hand-written signatures.

A reliable method to verify the holder of such a document and to establish whether the document itself is genuine is described in the unprepublished Dutch patent 1020903 of the applicant.

The Dutch patent 1023614 of the applicant, of which the present claims have been delimited, describes a system and a method for requesting and issuing an authorization document. This document describes a device and method for requesting and issuing an authorization document with a photograph of the holder and a chip containing biometric data in a chip memory. A biometric recorder records biometric data of the holder. These biometric data are sent, together with a unique number, in an enciphered form to a back office. In the back office, the biometric data with the aid of the unique number are combined with, for example, a photograph and signature of the holder of the authorization document.

Once the authorization document has been made and sent to a counter in the front office, the chip memory of the chip is read out there to thus obtain the read-out biometric data. Then, in the front office, with the aid of the biometric recorder, the biometric data of the holder are recorded again. The recorded again biometric data are compared with the biometric data read out of the chip memory. Only then is the authorization document handed over to the holder.

SHORT SUMMARY OF THE INVENTION

It is an object of the present invention to provide a system and an method with which an authorization document can be requested and issued, the said authorization document having a chip containing biometric data of the holder, and whereby the protection of personal information is increased.

To that end, the invention first of all provides a device for supporting the issuing of an authorization document, as claimed in claim 1. By providing a computer, a separate clerk unit and a separate client unit, the security can be increased in a simple manner. In general, the computer is already present on each work spot in an office and is used for all kinds of applications that do not intrinsically demand a secure environment. This computer can then remain in such an insecure (or only lightly protected) environment. The clerk unit is however strongly protected by providing it with an internal secure application module containing a cryptographic key that is necessary for setting up a secure communication session between the computer and the clerk unit, during which said session the request procedure for requesting the authorization document is run through.

The invention also relates to an assembly comprising a clerk unit and a client unit.

Moreover, the invention includes a communication system and method.

DESCRIPTION OF FIGURES

The invention will be described on the basis of several figures which are only intended to illustrate and not to restrict the scope of the invention, which is only limited by the appended claims and their equivalents.

DESCRIPTION OF EMBODIMENTS

Figure 1:
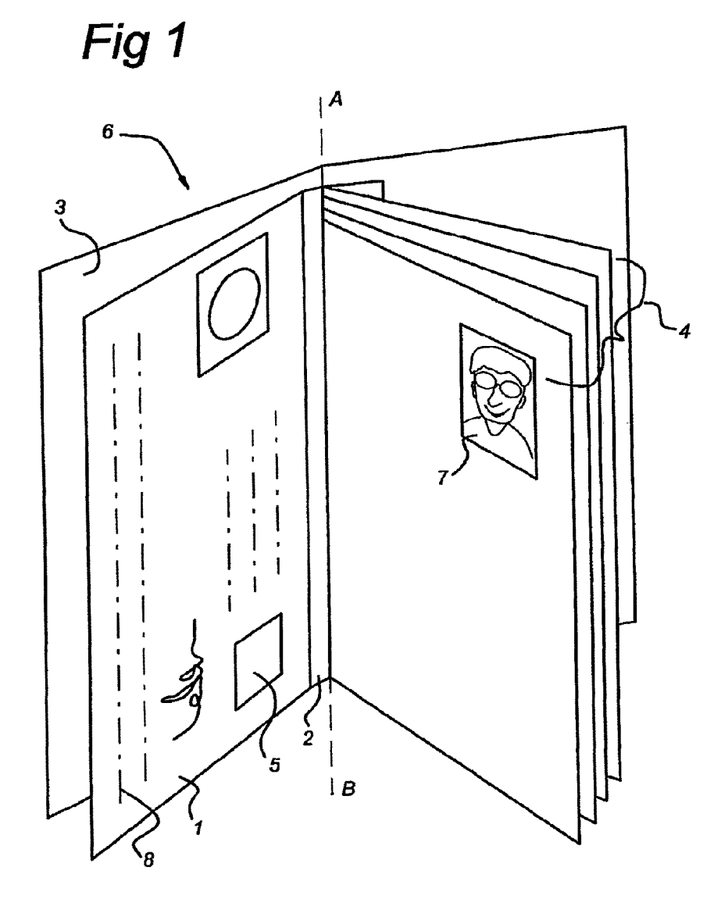
FIG. 1 shows an authorization document in the form of a booklet, for example a passport, in which there is a chip containing biometric data.
Figure 2:
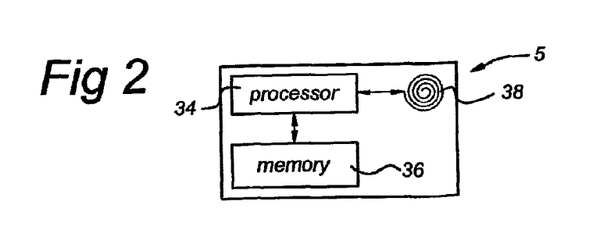
FIG. 2 shows a schematic representation of a chip such as that which can be included in the authorization document according to FIG. 1.

An example of an authorization document is a passport 6, as shown in FIG. 2. With the exception of chip 5, the shown passport 6 is described extensively in the European patent application EP-A-1,008,459. The passport as described in that document, including all the embodiments thereof, can be used in the present invention. The passport 6 includes a card 1 comprising text, a passport photograph and a signature. The card 1 can, for example, be made of synthetic laminate. The card 1 is attached to a strip 2, which enables the card to be held in place in a booklet. Present on the card 1 are machine-readable holder data which can be read in by an OCR (optical character recognition) unit. For this purpose, these holder data are in a zone 8 that is machine readable (MRZ=Machine Readable Zone).

In addition, the booklet contains pages 4, suitable for accommodating visas for visiting foreign countries, for example. On one of the pages is a photograph 7 of the holder of the authorization document 6. The booklet also contains a cover 3. For additional details and embodiments, the reader is referred to the mentioned European patent application EP-A-1,008,459.

The card 1 includes a chip 5. The chip 5 is preferably integrated in the card 1 such that this chip 5 cannot be removed without damaging the card 1.

FIG. 2 shows an embodiment of the chip 5 in the authorization document 6. The chip 5 includes a processor (CPU) 34 which is connected to a memory 36 and also to input/output unit 38.

The memory 36 includes, for example, ROM and a non-volatile memory, like an EEPROM, but also other types of memory can be used. After the passport 6 has been delivered to the holder, stored in the memory will be at least: a private key (preferably in ROM, so that this cannot be altered), a biometric certificate and (optionally) a certificate of an issuing body. The biometric certificate includes biometric characteristic data of the holder of the passport and data that have a predefined relationship with the machine-readable data.

The input/output unit 38 is preferably suitable for contactless communication with the device shown in the following figures. For this purpose, the input/output unit 38 can preferably be made as a circular antenna, as shown in FIG. 2. Other embodiments are however possible. Also contact surfaces as known in modem chip cards and manufactured according to ISO 7816 are possible.

It should be clear that FIG. 2 only shows one embodiment. If desired, multiple processing units can be provided, as well as multiple types of memory and multiple input/output units. Preferably, the chip 5 receives its power supply energy from the device that writes data to or reads data out of the memory 36. For this purpose, the chip 5 is implemented as a transponder unit. Such a transponder unit is known in the art and does not have to be elucidated in-depth here. Naturally, a battery can be provided instead, although in most cases this is very impractical.

Besides data, the memory 36 includes instructions which after having been read out by the processor provide a certain functionality as known in the art.

Figure 3:
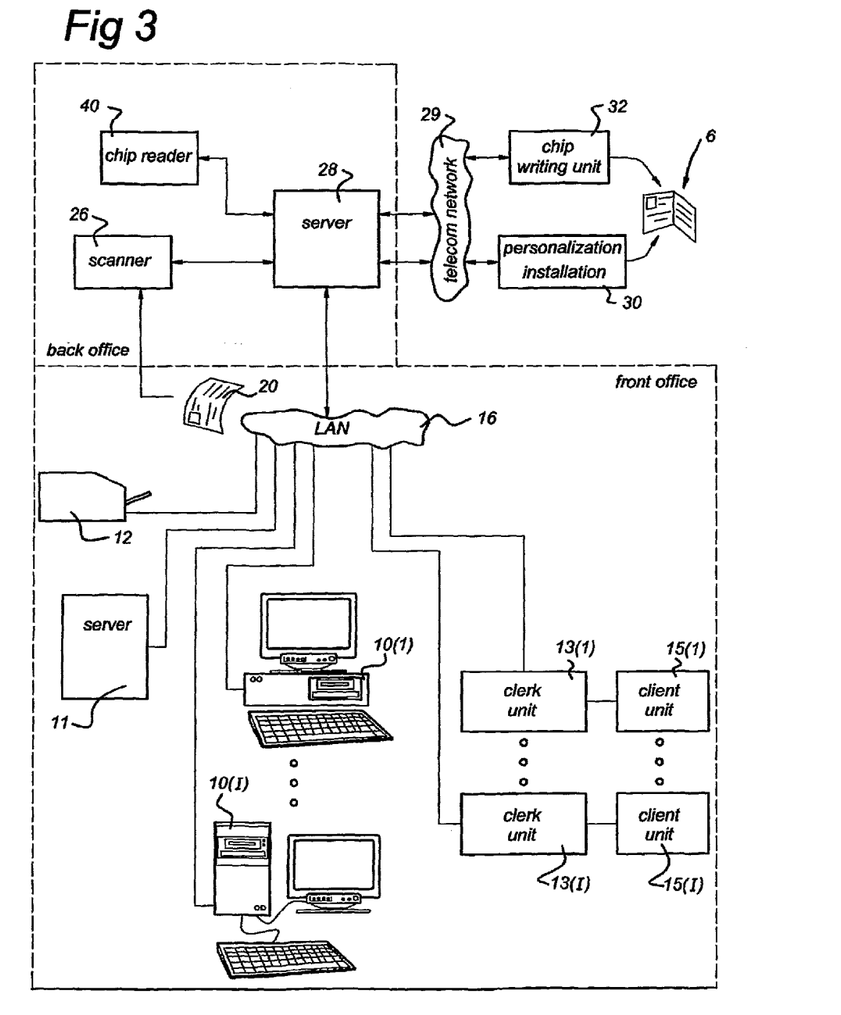
FIG. 3 shows a system for supporting the requesting and issuing of an authorization document, such as a passport.

FIG. 3 shows a system that is suited to decentralised requesting of an authorization document (for example, a municipal building), centralized manufacture (for example, in a protected printing-works), and decentralised issue to the applicant afterwards. The system shown in FIG. 3 contains several components which are in a front office and several components which are in a back office. The components for the front office can be set up in multiple locations. The components shown can, for example, be set up in any municipal building. The components in the back office can also be in the same municipal building. It is however conceivable that the back office is accommodated elsewhere and serves one or more front offices.

In general, the front office and back office will be separated from each other, not only physically but also by a network 16, which, for example, is a Local Area Network (LAN).

In the front office are multiple workstations in the form of computers $10(i)$ (i=1, 2, 3, . . . , I). Each workstation constitutes the work spot for a clerk (or other operator) and in general will have all functionality that a modem workstation offers, such as a word processing application, Internet access, etc. The front office also includes a server 11, one or more printers 12, various clerk units $13(i)$ and client units $15(i)$. In one embodiment, each computer $10(i)$ is comprising a clerk unit $13(i)$. In this way, each clerk unit $13(i)$ is coupled to a client unit $15(i)$.

In the embodiment drawn in FIG. 3, the computers $10(i)$, server 11, one or more printers 12, and clerk units $13(i)$ are connected to the local area network (LAN) 16, such that they can communicate with each other.

The server 11 includes data under a so-called "Gemeentelijke Basis Administratie" (GBA) [Municipal Basis Administration], that is to say, data related to all residents of a municipality, such as name, address, place of birth, year of birth, family relations, etc. These data are stored in a memory belonging to the server 11.

The printer 12 can produce an application form 20 for requesting an authorization document 6. Each application form 20 contains a unique number that preferably has been printed beforehand. In one embodiment, a clerk enters the unique number of the application form 20 that is being handled into the computer 11, for example, with the keyboard of his computer $10(i)$. The clerk takes care that the data of an applicant from an authorization document 6 is printed at the correct place on the application form, by means of the computer 11 with its associated keyboard, mouse, monitor, etc. After that, a passport photograph of the holder of the authorization document 6 as well as his/her signature is placed on the application form 20.

As further explained below, in a further embodiment, a physical application form 20 is not used, namely when an all-digital request process is used.

Via the LAN 16, the server 11 can communicate with a server 28 set up in the back office. The server 28 is connected to a chip reader 40 and a scanner 26. Via a communication network 29, the server 28 can communicate with a chip writing unit 32 and a personalization installation 30. The personalization installation 30 is arranged to put a personal identification mark on the authorization document. This can be done for example by a laser or with printing ink, or in any other known way. For example, a print of a photograph of the owner of the authorization document can be burned into a layer of the card 1 with a laser. The chip writing unit 32 and personalization installation 30 can be set up centrally in a protected location and can serve multiple back offices. The connections between the server 28 and the remaining components are drawn as physical lines. However, it will be clear to those skilled in the art that these lines do not have to be physical. Instead, wireless connections can be used. The components can also be placed at a (smaller or larger) distance from the server 28. With the aid of data received from the server 28, the personalization installation 30 is able to put the necessary data on the authorization document 6. The chip writing unit 32 is arranged to store data received from the server 28 in the chip 5 of an authorization document 6.

The scanner 26 is arranged to read and to digitize the data on the application form 20, such as the data of the holder and the photograph of the holder, after the application form 20 has arrived in the back office, and to send the digitized data to the server 28.

Figure 4:
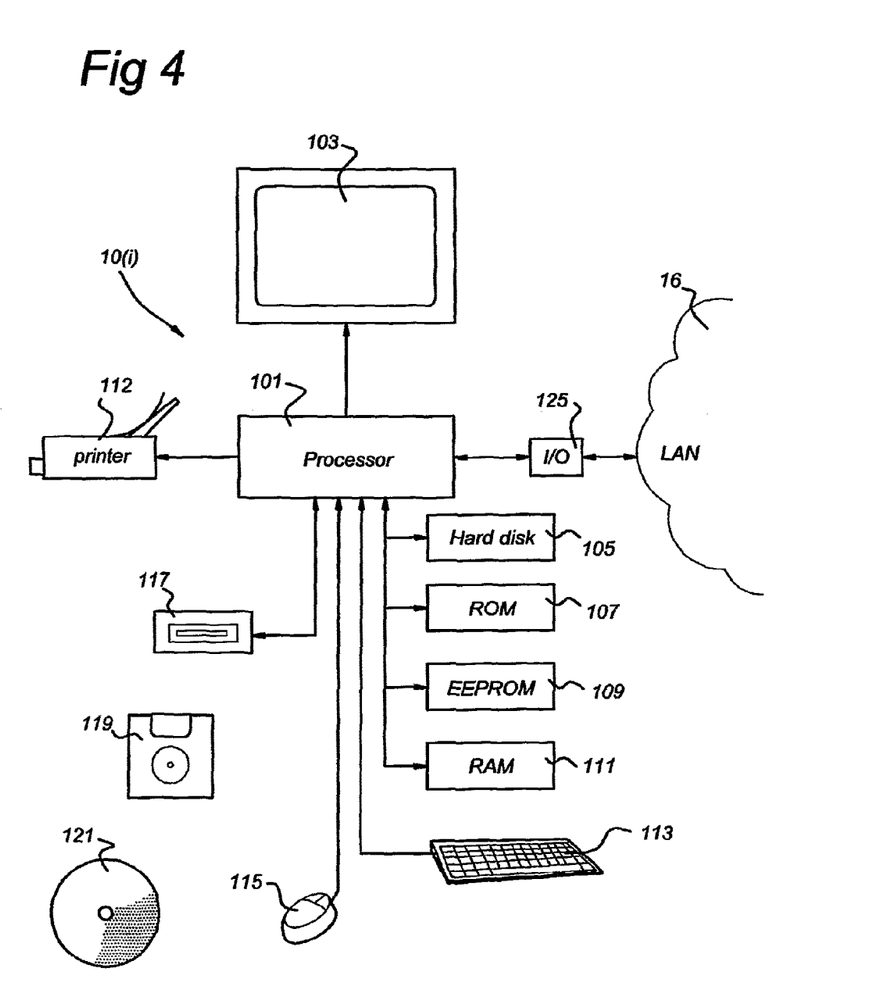
FIG. 4 shows a diagram of a computer that can be used in the invention.

FIG. 4 shows an example of the computer $10(i)$ in more detail. Naturally, the server 11 and the server 28 can also have a similar construction.

The computer $10(i)$ has a processor 101 for performing arithmetic operations.

The processor 101 is connected to a number of memory components including a hard disk 105, Read Only Memory (ROM) 107, Electrically Erasable Programmable Read Only Memory (EEPROM) 109 and Random Access Memory (RAM) 111. Not all of these memory types need to be present. Moreover, they do not need to be placed physically near to the processor 101. They can also be at a distance from it.

The processor 101 is connected likewise to means, such as a keyboard 113 and a mouse 115, to enter instructions, data, etc. by a user. Other input means known in the art, such as a touch screen, a track ball and/or speech converter can also be used.

A reader unit 117 connected to the processor 101 is provided. The reader unit 117 is arranged to read data from or possibly store data to a data carrier, such as a floppy disk 119 or a CD-ROM 121. Other possible data carriers are, for example, DVDs or memory sticks, as known in the art. The data carriers can, for example, have suitable computer programs, i.e. instructions and data, which after having been read out by the computer 10 (or the server 28) provide the functionality needed by the invention. Such software can also be offered via the Internet or similar.

The processor 101 can be connected to a printer 112 for printing output data on paper, as well as to a display unit 103, for example, a monitor or LCD (Liquid Crystal Display) screen, or any other kind of display unit known in the art.

The processor 101 is connected to the LAN 16 by means of input/output unit 125. The processor 101 is arranged to communicate with other communication devices via the LAN 16.

The processor 101 can be implemented as a stand-alone system or as a number of processors operating in parallel, each of which is arranged to execute sub-tasks from a larger program, or as one or more main processors with various sub-processors. If desired, parts of the functionality of the invention can even be performed by remote processors, which communicate with processor 101 via LAN 16.

Although the connections are shown as solid, fixed lines, these can all be implemented as wireless connections.

Figure 5:
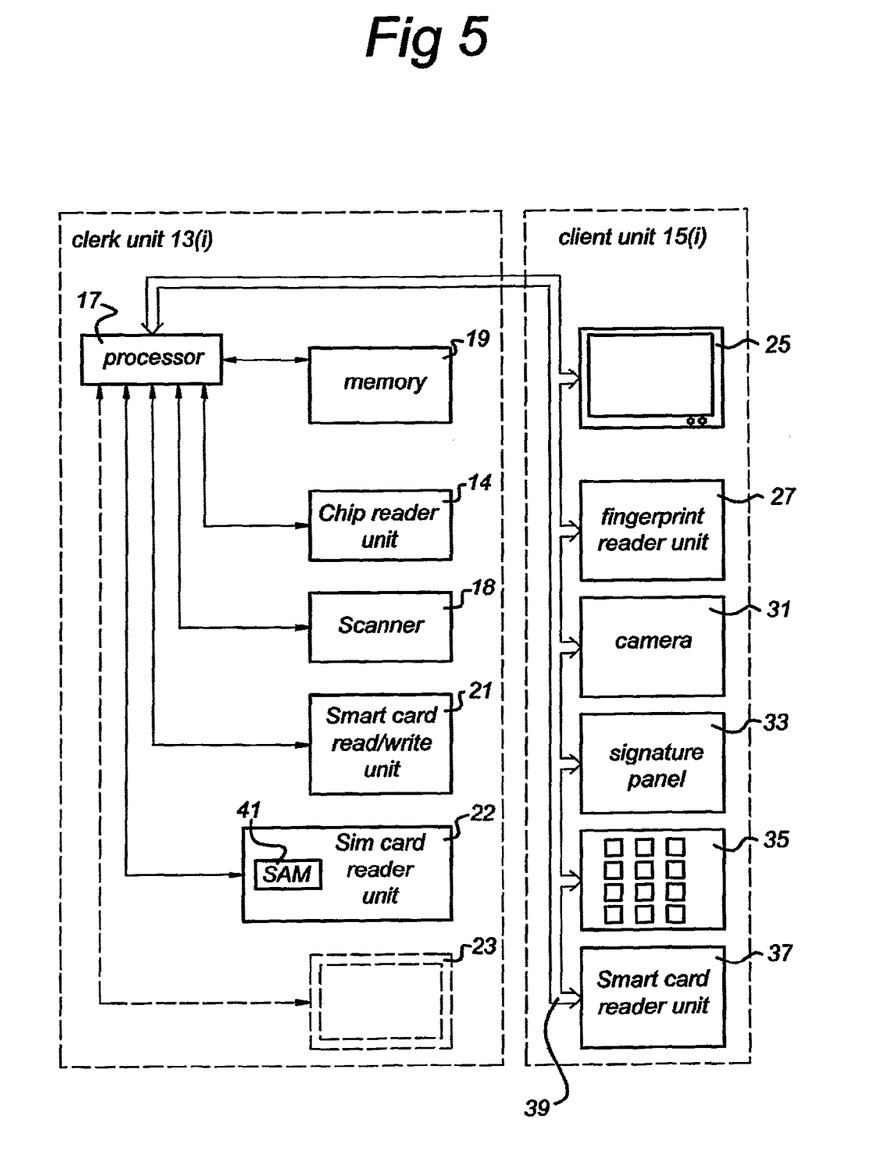
FIG. 5 shows a clerk unit and a client unit in more detail.

FIG. 5 shows both a clerk unit 13(*i*) and a client unit 15(*i*) in more detail. In a municipal building, for example, the clerk unit 13(*i*) will be set up on the side of a counter (or table) where the clerk has his/her work spot, while the client unit 15(*i*) will be set up on the other side of the same counter where a client will stand or sit when requesting an authorization document 6. These two sides of the counter can, for example, be physically separated by means of a glass partition.

The clerk unit 13(*i*) includes a processor 17 which is connected to a memory 19, a chip reader unit 14, a scanner 18, one or more smart-card reader units 21, one or more SIM card reader units 22 and possibly a display 23. To repeat: the connections can be implemented as fixed or wireless. The SIM card read/write unit 22 includes a SAM 41 (=Secure Application Module). A SAM is a component that stores data relating to security, such as cryptographic keys. This storage is itself also secure.

The memory 19 includes data and instructions in the form of a computer program to allow the processor 17 to execute certain functions.

In FIG. 5, an embodiment of the clerk unit 13(*i*) and the client unit 15(*i*) is drawn with dotted lines surrounding them. This is intended to indicate that the components inside the lines can be accommodated in one housing. This is not however essential.

The client unit 15(*i*) of FIG. 5 includes a display 25, a fingerprint reader unit 27, a camera 31, a signature panel 33, a keyboard 35 and a smart-card read/write unit 37. It is indicated that all of these devices are connected via a connection 39 to the processor 17. Moreover, all these devices are inside a dotted line, which indicates that in theory they can be accommodated in one housing. This is not however essential.

The display 25 can receive and display data. Notice that the display 25 can also be omitted. The fingerprint reader unit 27 can record the fingerprint of a holder of an authorization document, convert it to a digital fingerprint signal and send this signal to the processor 17. The camera 31 can take photographs of the face of the holder of an authorization document, convert it to a digital photograph signal and send this signal to the processor 17. It is also conceivable that the camera 31 is omitted. In that case, a client will hand over his/her photograph to the clerk who can then, for example, scan in the photograph with the scanner 18. The photograph can also be scanned in elsewhere. The signature panel 33 can record a signature of a holder of an authorization document, convert it to a digitized signature signal and send this signal to the processor 17. Using the keyboard, a holder can, for example, enter a code and send this to the processor 17. The smart-card read/write unit 37 can read out a smart card.

The clerk unit 13(*i*) can have the following components.
1. The processor 17 can be a mini PC with Pentium M processor, 1 Gbyte RAM, 1.5 Gbyte flash disk and 10/100 Mbit Ethernet connection.
2. The smart-card reader unit 21 and the SIM card reader unit 22 can be arranged to read out 2*ID1 and 2*ID000 card formats and ISO 7816 and PC/SC compliant cards.
3. The chip reader unit 14 can be an "RF reader" (RF=radio frequency), for example, ISO 14443 A&B compliant. For ease of use by the clerk, the chip reader unit 14 can be integrated with the scanner 18 for recording the MRZ 8, as will be explained hereafter with reference to FIG. 6. This makes it possible for the clerk to read the MRZ and the chip in one action. The data in the MRZ are used, for example, as a sort of PIN code to read the contents of the chip in an authorization document. That provides a certain degree of protection against reading out the contents of such a chip, because no one who only has the equipment to read out the MRZ can read out the chip. The chip cannot then, for example, simply be read out by a contactless chip reader unit (unperceived) to obtain someone's authorization document.
4. In addition, the unit can have USB ports, for example, USB 2.0, 0.5 mA. These ports are to be used to connect the keyboard 35, a mouse (not shown), the fingerprint reader unit 27, the signature panel 33, the smart-card read/write unit 37, etc.
5. The display 23 can, for example, be an LCD screen of 6.4".

The client unit 15(*i*) can have the following components.
1. The display 25 can, for example, be an LCD screen of 8.4".
2. The signature panel 33 can be integrated with an LCD screen and comprising a special pen/stylus.

Figure 6:
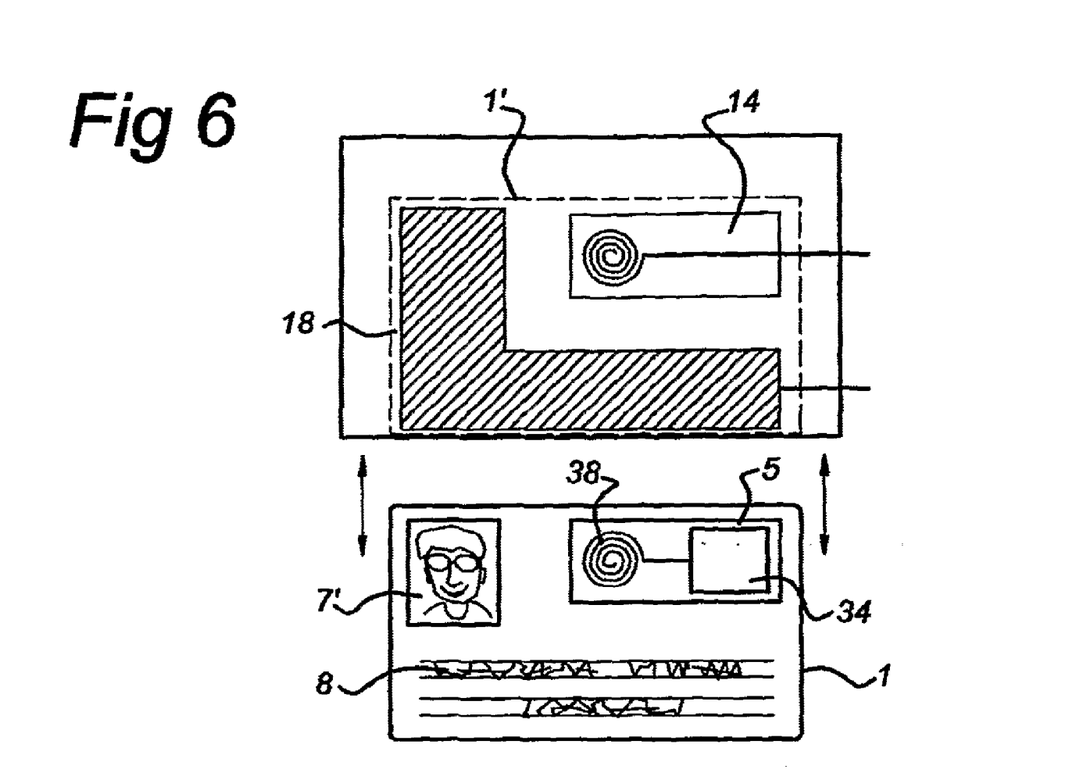
FIG. 6 shows a scanner comprising an OCR (optical character recognition) unit as well as a chip reader unit.

FIG. 6 shows a preferred embodiment of the locations for the chip reader unit 14 and the scanner 18. Preferably, they are set up such that they can perform their functions simultaneously. FIG. 6 shows the card 1 from the authorization document 6 (compare with FIG. 1). 7' indicates that the card 1 can also contain a photograph of the holder. This will have been imprinted there by the personalization installation 30 (see FIG. 3). In one position, indicated by 1', the card 1 can be placed, for example, via a suitable slot in a housing containing the chip reader unit 14 and the scanner 18, such that the scanner 18 can read out the photograph 7' and the MRZ 8 while simultaneously the chip reader unit 14 can read out the chip 34 on the card 1. The scanner 18 is then arranged to provide OCR of the symbols in the MRZ and to digitize the image of the photograph 7'.

In the set-up mentioned above, each combination of clerk unit 13(*i*) and client unit 15(*i*) can be fully controlled from an associated workstation or computer 10(*i*). For the implementation of each combination of clerk unit 13(*i*) and client unit 15(*i*), it is not necessary to set up a second computer (or PC) at the work spot of a clerk. Each combination of clerk unit 13(*i*) and client unit 15(*i*) can be replaced, if necessary, simply by an administrator of the clerk work spots with a new one. The contents of such a combination of clerk unit 13(*i*) and client unit 15(*i*), including the necessary software, as well as physical security and software security, can be checked by an authority that is responsible for printing the authorization document 6 and writing to the chip 5 on it. This software security will be described later.

The memory 19 in a clerk unit 13(*i*) has stored software to control a combination of a clerk unit 13(*i*) and a client unit 15(*i*). In one embodiment this software includes:

1. A (web) application for controlling both the clerk unit 13(*i*) and the client unit 15(*i*). This application is responsible for, among other items, the user interface, that is, what appears on displays 23 and 25, the control of the hardware and software components and all data communication with other systems, such as the computer 10(*i*) and the server 11.
2. An operating system. The memory 19 contains, for example, an embedded version of Microsoft Windows XP™.
3. Software for creating a so-called "full frontal image". This software is used to receive and process digital data related to a scanned photograph of the holder scanned by the scanner 18. This software produces a standardized image of this photograph. This standardized image of the photograph is used later for a graphical reproduction 7' on the authorization document 6 and also for digital storage in the chip 5 of the authorization document 6. This software can, for example, generate a "token image". A "token image" is a specific form of digital storage for photographs defined in ISO 19794. Another example is "full frontal image".
4. Software for checking the quality of the photograph scanned by the scanner 18 and of the "full frontal image" based on this photograph, and also of the "token image" if any. This software is intended to determine the level of agreement with the ISO 19794 standard. If this level of agreement falls below a certain threshold, the scanned photograph will be rejected and for this purpose the clerk will receive a conducive message, for example, via display 23 or on the monitor of the computer 10(*i*). The holder must then supply another photograph. The advantage of scanning and judging the agreement with the ISO 19794 standard on the spot is that the holder can have a new photograph taken immediately, if necessary, instead of receiving a call up later at home if defects are found.

Figure 7:
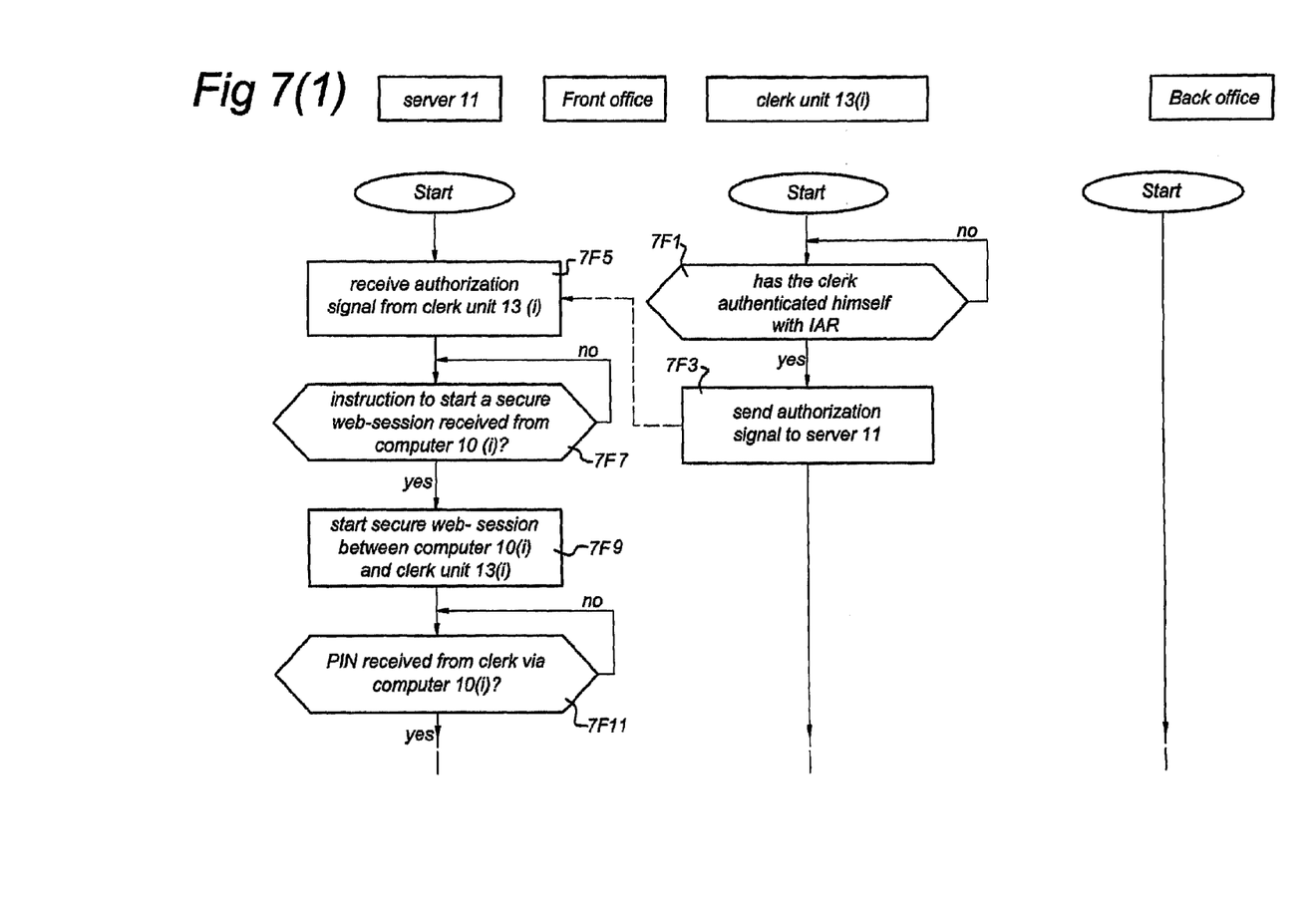
FIG. 7 shows a flowchart of an method for requesting and issuing an authorization document according to the invention.

A process for requesting and issuing an authorization document 6 will now be explained with the aid of FIG. 7.

The process starts with action 7F1, in which the processor 17 of the clerk unit 13(*i*) checks whether the clerk has authorized himself. For this purpose, the clerk has been issued with an identification card (in The Netherlands, also known as an IAR card. IAR=Identifiatiekaart Aanvraagsysteem Reisdocument [Identification Card Application System Travel Document]) which he lets the smart-card read/write unit 21 read. This ensures that only an authorized person has the possibility to start the process. If the clerk has authorized himself with his identification card, the processor 17 sends, in action 7F3, an authorization signal to the server 11.

In action 7F5, the server 11 receives the authorization signal from the clerk unit 13(*i*).

In action 7F7, the server 11 waits until it has received from computer 10(*i*) an instruction to start a secure web-session. Such an initiative is sent by the clerk who is operating the computer 10(*i*). Once such an instruction has been received, the server 11 starts, in action 7F9, the secure web-session between the computer 10(*i*) and the clerk unit 13(*i*).

The session between the computer 10(*i*) at the work spot of the clerk and the clerk unit 13(*i*) is, for example, an https session, by which the mutual communication is enciphered by using SSL. "SSL" refers to "Secure Socket Layer" and is one of the most important security protocols used, for example, on the Internet. For this SSL session, unilateral authentication is used, in which the clerk unit 13(*i*) authenticates itself. For this purpose, the clerk unit 13(*i*) is comprising an asymmetrical key pair (which can be used, for example, in the well-known RSA protocol) with a certificate (for example, X.509). This key pair together with the certificate are stored in the SAM 41 in the SIM card read/write unit 22 of the clerk unit 13(*i*). To make this procedure of authentication operational, the operating system of the computer 10(*i*) must have knowledge of (in other words, must have stored) a so-called root certificate associated with the certificate of the clerk unit 13(*i*) and which is assumed to be reliable. At the same time, a web-browser which can handle this must be present, for example, Internet Explorer 6.0 or Mozilla Firefox 1.0.6 or higher, in which the web-browser is configured so as to make the use of SSL possible. In one embodiment, to enable the secure browser session to operate correctly, an applet is used. This applet is sent as a part of the https session by the clerk unit 13(*i*) and is executed by the server 11. Alternatively, the server 11 can retrieve such an applet from the computer 10(*i*). To ensure that the correct applet is used and that the content of this applet is not corrupt, the software code of the applet can be undersigned (also known as "code signing"). The software of the applet signed in this way can be checked by server 11 by making use of the same root certificate as used for the SSL certificates. For the applet to function correctly, use can be made of, for example, Java-runtime environment version 5.0 update 4 or higher on the computer 10(*i*) of the clerk.

As soon as the secure web-session has been started once (action 7F9), the server 11 waits for a PIN (personal identification number) to be entered by the clerk via the computer 10(*i*), action 7F11. As soon as the clerk has entered his PIN, the server 11 allows the log-in of the clerk to the secure web-session, action 7F13.

As an option, the server 11 can print an application form with printer 12 on which a clerk can later fill in all application data and on which an applicant can place his/her signature. Printing occurs, for example, in action 7F14. Such an application form can be physically transported to the back office. A physical passport photograph of the applicant of the authorization document 6 can be attached to such an application form.

In action 7F15 a biometric characteristic of the applicant for the authorization document 6 is recorded. Such a biometric characteristic can be the fingerprint of the holder, for example, which is then recorded with the fingerprint reader unit 27. Alternatively, or as a supplement, the biometric characteristic can relate to a photograph of the face of the holder, taken with the camera 31. The camera 31 is arranged to generate a digital image of the face of the client. Alternatively, as mentioned earlier, the client can hand over a photograph which, for example, is scanned in by the scanner 18, which then sends a digital image of this to the processor 17. The recorded biometric characteristic is preferably checked for quality by the processor 17 in the clerk unit 13(*i*). This check will be automated as much as possible. It is however conceivable that a part of the quality check is performed by the on-duty clerk. For that purpose, the recorded biometric characteristic is displayed, for example, on the display 23 or on the monitor of the computer 10(*i*). During the quality check, use is made of standardized norms, for example, such as prescribed by the European Union.

In action 7F17, the biometric characteristic in the prescribed standardized format is sent to the server 11. In action 7F19, the server 11 receives the biometric characteristic from the clerk unit 13(i).

The clerk then enters the application data of the holder into the computer 10(i) with the aid of, for example, his keyboard. These application data relate, for example, to the name, address, place of birth, year of birth, family relations, height, etc. In action 7F20, the server 11 receives these application data of the holder from the computer 10(i).

In action 7F21, the server 11 sends these application data to the processor 17 of the clerk unit 13(i). The processor 17 then displays these application data on display 25 in action 7F22. The applicant for the authorization document 6 can then check the application data shown to him on display 25. If the applicant agrees with the application data shown to him, he is invited to produce a signature on the signature panel 33. In action 7F23, the processor 17 receives such a signature. In action 7F24, the processor 17 sends this signature, after having digitized it, to the server 11. In action 7F25, the server 11 receives the digitized signature. This signature can then also be displayed again on display 23 or on the monitor of the computer 10(i), so that the clerk can check whether this signature meets the norms. The digitized signature is added to the application data by the server 11.

In action 7F27, the server 11 sends the application data, the biometric characteristic and the digitized signature to the back office. These data can be comprising a digital signature by the SAM unit 41 in the SIM card read/write unit 22.

Action 7B1 is an optional action which will occur when working with a paper application form as printed in action 7F14 and on which a clerk can later fill in the necessary data and on which an applicant has placed his/her signature. In action 7B1, the scanner 26 scans the received application form and sends the scanned in data to the server 28. In action 7B3, the server 28 receives the application data, the biometric characteristic and the digitized signature from the server 11 via the network 24. If an application form is physically scanned in, the imprinted data on the form are checked against the data received via the network. This is possible, for example, because a unique code is imprinted on the application form, and this unique code together with the application data, the biometric characteristic and the digitized signature is sent to the back office. This unique code is used to link the data from the different routes. However, it is expected that the use of a physical (paper) application form will no longer be used in the future and that all the data necessary to produce an authorization document 6 will only be sent via the network 24.

The data sent in action 7F27 are preferably undersigned with a digital signature by the clerk. For this purpose, the clerk can again make use of his identification card, which he presents to the smart-card read/write unit 21. The digital undersigning of these data is a functionality of the server 11. For increased security of the data traffic, preferably all data that in action 7F27 is sent from the server 11 to the server 28 is enciphered again. Alternatively, a secure connection can also be set up between the server 11 and the server 28, for example, in the form of a VPN (virtual private network) connection.

In action 7B7, the server 28 sends the application data, the biometric characteristic and the digitized signature to the personalization installation 30 and to the chip writing unit 32 respectively. This occurs, for example, again after these data have all been enciphered and have again been digitally undersigned by an operator who for this purpose makes use of the chip reader 40. For this purpose, the operator has a chip card with a chip containing his own data which can be used to digitally undersign the data.

Then the authorization document 6 is made, whereby the personalization installation 30 prints the application data in a predefined manner on the document. Moreover, this personalization installation prints the necessary data in the MRZ zone 8. The chip writing unit 32 will moreover store the application data, the biometric characteristic and the digitized signature in the chip 5 of the authorization document 6. When the biometric characteristic relates, for example, to the face of the holder, the personalization installation 30 can also print a copy of the face as a photograph 7' (see FIG. 6) on the card 1, on which the chip 5 is also located.

When the authorization document 6 is ready, the authorization document 6 is sent to the front office, for example, via a secure means of transport and via the back office, where the applicant for the authorization document 6 can pick up the document. The issuing of the authorization document 6 to the applicant is done in a secure manner. The applicant who comes to pick up the produced authorization document 6, is again obliged to allow his biometric characteristic, for example a fingerprint, to be scanned. In action 7F31, the processor 17 receives the digitized biometric characteristic of the holder again. In action 7F33, processor 17 sends this biometric characteristic to the server 11 again.

In the meantime, in action 7F29, the server 11 has received a signal from the server 28 that the authorization document 6 has been made and sent back. In action 7F35, the server 11 receives the scanned again biometric characteristic.

In action 7F37, with the aid of the scanner 18, the clerk lets the MRZ data of the card 1 of the authorization document 6 be read out. Then, (or earlier, or at the same time) the chip reader unit 14 reads out the data relating to the biometric characteristic from chip 5 of the card 1. This occurs in action 7F39. Preferably, this reading out can only happen if the correct MRZ data 8 are read out. The MRZ data 8 form a sort of PIN code for reading out from the chip 5. Moreover, the communication between the chip 5 and the chip reader unit 14 occurs in a secure manner by making use of a key on the SAM unit 41. Then the chip 5 must also be arranged for such secure communication, that is, by having stored a key and a suitable computer program for such a secure communication. Then the document 6 and the chip 5 can be authenticated by the processor 17. This occurs in action 7F41. If this authentication is successful, the processor 17 sends an authentication signal, as well as the biometric characteristic stored in the chip 5 to the server 11.

This authentication signal, as well as the read out biometric characteristic is received by the server 11 in action 7F45.

In action 7F47, the server 11 checks whether the scanned again biometric characteristic is identical to the biometric characteristic stored in the chip 5. If not, then the server 11 gives a negative indication, action 7F49, for example on the monitor of the computer 10(i). If these two characteristics are in agreement, a positive indication follows, action 7F51.

After such a positive indication, the server 11 registers in a memory that the document 6 has been issued to the holder, action 7F53. The fact that the authorization document has been issued is likewise signalled back by the server 11 to the server 28 of the back office which likewise registers that the authorization document 6 has been issued in the correct manner, action 7B9.

In one embodiment a "biometric certificate" as described in the Dutch patent 1020903 is used, the complete contents of which are included here as a reference. The biometric certificate is stored in the chip memory 36 of chip 5 and includes biometric characteristic data of the holder of the authorization document and data which has a predefined relationship with the machine-readable data in the MRZ. In a special embodiment the biometric certificate and the holder data (for example, the data in the MRZ) are coupled to each other with a one-way function (HASH).

In summary, the SAM unit 41 can be used in the following ways.
1. First of all, data related to one or multiple keys in the SAM unit 41 can be used for authorization of the application system.
2. The one or more keys in the SAM unit 41 can be used for secure communication with other systems if they also are arranged for this purpose, for example, by putting digital signatures in a data stream. This concerns for example secure communication with the servers 11 and 28.
3. By using the one or more keys in the SAM unit, the chip reader unit 14 can establish a secure communication session with the chip 5 on the authorization document 6.

The keyboard 35 can be used to allow a client to type in a PIN code with which to identify himself. This will be used in combination with the smart-card read/write unit 37, which can read out a chip on an identification card on which this PIN code is also stored. The keyboard can be implemented as a touch panel that at the same time serves as the signature panel 33.

The invention claimed is:

1. A system for supporting the requesting and issuing of an authorization document to an applicant, the said system comprising at least:
   a server arranged to communicate with a back office which is arranged to produce said authorization document;
   a computer comprising a first processor and a first memory containing stored first data and instructions to allow the first processor to execute a first defined program;
   a clerk unit comprising a second processor and a second memory containing stored second data and instructions to allow the second processor to execute a second defined program, as well as a secure application module;
   a client unit comprising at least a biometric characteristic reader unit for reading a biometric characteristic of the applicant; and
   wherein the server, the computer and the clerk unit are connected to one another via a local area network such that they can communicate with one another, the client unit and the second processor are arranged to communicate with each other, a combination of a clerk unit and a client unit are controlled by the computer, the clerk unit is arranged to control the client unit in said combination, and the first processor in the computer and the second processor in the clerk unit are arranged to communicate with each other in the form of a secure session that makes use of a cryptographic key stored in the secure application module, the system being arranged to perform the following actions:
      starting said secure session between the computer and the clerk unit by the server when the server has received an authorization signal from the clerk unit and an instruction to start such a secure session from the computer, the authorization signal being generated by the clerk unit once an operator has authorized himself,
      allowing said operator to log-in to said secure session after inputting a personal identification number,
      receiving by the server of a biometric characteristic from the applicant of the authorization document from the clerk unit as obtained by means of the client unit,
      receiving by the server of application data of the applicant from the computer,
      receiving by the server a digitized signature from the applicant of the authorization document from the clerk unit as obtained by means of the client unit,
      transmitting by the server, said application data, biometric characteristic and digitized signature to said back office, all these data being digitally undersigned by a key stored in the secure application module and being either enciphered or sent via a secure connection.

2. The system as claimed in claim 1, wherein the secure application module has stored a cryptographic key pair with a certificate, and the first memory of the computer has stored a root certificate associated with the certificate.

3. The system as claimed in claim 1, wherein the session is an https session.

4. The system as claimed in claim 1, wherein for the functioning of the secure session, the server makes use of an applet, which the server receives from either the computer or the second processor of the clerk unit.

5. The system as claimed in claim 4, wherein the applet includes software code that is comprising a digital signature, so that the integrity of the code can be checked.

6. The system as claimed in claim 1, wherein the clerk unit is comprising a smart-card read/write unit for reading out an identification card of an operator.

7. The system as claimed in claim 6, wherein the secure session can only be started when the second processor has received a code out of the identification card.

8. The system as claimed in claim 1, wherein the biometric characteristic reader unit includes at least one of the following: a fingerprint reader unit and a camera.

9. The system as claimed in claim 1, wherein the clerk unit is comprising a scanner connected to the second processor and arranged to read and recognise optical information on the authorization document.

10. The system as claimed in claim 9, wherein the clerk unit is comprising a chip reader unit connected to the second processor for reading out a chip in the authorization document.

11. The system as claimed in claim 9, wherein the system is arranged to set up a secure communication session between said chip reader unit and the chip with the aid of a key stored in the secure application module.

12. A communication system comprising:
   a system for supporting the requesting and issuing of an authorization document to an applicant, the system comprising at least
      a first server arranged to communicate with a back office which is arranged to produce said authorization document,
      a computer comprising a first processor and a first memory containing stored first data and instructions to allow the first processor to execute a first defined program,
      a clerk unit comprising a second processor and a second memory containing stored second data and instructions to allow the second processor to execute a second defined program, as well as a secure application module, and
      a client unit comprising at least a biometric characteristic reader unit for reading a biometric characteristic of the applicant;

wherein the server, the computer and the clerk unit are connected to one another via a local area network such that they can communicate with one another, the client unit and the second processor are arranged to communicate with each other, a combination of a clerk unit and a client unit are controlled by the computer, the clerk unit is arranged to control the client unit in said combination, and the first processor in the computer and the second processor in the clerk unit are arranged to communicate with each other in the form of a secure session that makes use of a cryptographic key stored in the secure application module, the system being arranged to perform the following actions:

starting said secure session between the computer and the clerk unit by the server when the server has received an authorization signal from the clerk unit and an instruction to start such a secure session from the computer, the authorization signal being generated by the clerk unit once an operator has authorized himself;

allowing said operator to log-in to said secure session after inputting a personal identification number;

receiving by the server of a biometric characteristic from the applicant of the authorization document from the clerk unit as obtained by means of the client unit;

receiving by the server of application data of the applicant from the computer;

receiving by the server a digitized signature from the applicant of the authorization document from the clerk unit as obtained by means of the client unit;

transmitting by the server, said application data, biometric characteristic and digitized signature to said back office, all these data being digitally undersigned by a key stored in the secure application module and being either enciphered or sent via a secure connection; and a back office, wherein the back office includes at least a second server for communication with the system for supporting the requesting and issuing of an authorization document, the second server is arranged for receiving said application data, biometric characteristic and digitized signature, and includes a personalization installation for putting information on the authorization document and a chip writing unit for writing at least the biometric characteristic to a chip located in the authorization document.

13. A method for supporting the requesting and issuing of an authorization document to an applicant, which method includes:

providing a server arranged to communicate with a back office which is arranged to produce said authorization document;

providing a computer comprising a first processor and a first memory containing stored first data and instructions to allow the first processor to execute a first defined program;

providing a clerk unit comprising a second processor and a second memory containing stored second data and instructions to allow the second processor to execute a second defined program, as well as a secure application module;

providing a client unit comprising at least a biometric characteristic reader unit for reading a biometric characteristic of the applicant; and communicating between the client unit and the second processor, and communicating between the first processor and the second processor in the form of a secure session that makes use of a cryptographic key stored in the secure application module;

the method also comprising the following actions:

starting said secure session between the computer and the clerk unit by the server when the server has received an authorization signal from the clerk unit and an instruction to start such a secure session from the computer, the authorization signal being generated by the clerk unit once an operator has authorized himself;

allowing said operator to log-in to said secure session after inputting a personal identification number;

receiving by the server of a biometric characteristic from the applicant of the authorization document from the clerk unit as obtained by means of the client unit;

receiving by the server of application data of the applicant from the computer;

receiving by the server a digitized signature from the applicant of the authorization document from the clerk unit as obtained by means of the client unit;

transmitting by the server, said application data, biometric characteristic and digitized signature to said back office, all these data being digitally undersigned by a key stored in the secure application module and being either enciphered or sent via a secure connection.

\* \* \* \* \*